United States Patent
Goto et al.

(10) Patent No.: US 6,876,093 B2
(45) Date of Patent: Apr. 5, 2005

(54) CAPACITANCE TYPE DYNAMIC QUANTITY SENSOR DEVICE

(75) Inventors: Keisuke Goto, Obu (JP); Tameharu Ohta, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/893,880

(22) Filed: Jul. 20, 2004

(65) Prior Publication Data

US 2005/0051910 A1 Mar. 10, 2005

(30) Foreign Application Priority Data

Sep. 5, 2003 (JP) ........................................ 2003-313820

(51) Int. Cl.[7] ........................ H01L 23/58; H01L 21/302; G01P 15/00
(52) U.S. Cl. ........................ 257/798; 257/417; 438/48; 438/50; 73/514.16
(58) Field of Search ................................ 257/415, 417, 257/418, 692, 698, 724, 780, 798; 438/48, 50, 51, 52, 53, 700, 701, 706, 719, 723; 73/514.16, 514.32, 514.33, 514.34

(56) References Cited

U.S. PATENT DOCUMENTS 6,313,529 B1 * 11/2001 Yoshihara et al. .......... 257/724
6,694,814 B2 * 2/2004 Ishio ........................ 73/514.32
2003/0154789 A1 * 8/2003 Sakai ....................... 73/514.32

FOREIGN PATENT DOCUMENTS

| JP | A-5-340960 | 12/1993 |
| JP | A-9-127148 | 5/1997 |
| JP | A-9-196684 | 7/1997 |

* cited by examiner

Primary Examiner—David Nelms
Assistant Examiner—Long Tran
(74) Attorney, Agent, or Firm—Posz & Bethards, PLC

(57) ABSTRACT

A capacitance type dynamic quantity sensor device includes a sensor chip having movable electrodes and sensor-chip side fixed electrodes disposed to confront the movable electrodes in a substrate surface horizontal direction X and a circuit chip disposed to confront the sensor chip. The movable electrodes are joined to the substrate through spring portions having degrees of freedom in the substrate surface horizontal direction X and the substrate surface vertical direction Z, so that the movable electrodes are displaceable in both the directions X and Z. A circuit-chip side fixed electrode is equipped at the site corresponding to the movable electrodes. The sensor chip and the circuit chip are electrically connected to each other through bump electrodes.

6 Claims, 5 Drawing Sheets

CAPACITANCE TYPE DYNAMIC QUANTITY SENSOR DEVICE

CROSS REFERENCE TO RELATED APPLICATION

This application is based upon, claims the benefit of priority of, and incorporates by reference the contents of Japanese Patent Application No. 2003-313820 filed on Sep. 5, 2003.

FIELD OF THE INVENTION

The present invention relates to a capacitance type dynamic quantity sensor device for detecting an applied dynamic quantity on the basis of variation of electrostatic capacitance between a movable electrode and a fixed electrode, and particularly to a capacitance type dynamic quantity sensor device with which a dynamic quantity in a multi-axial direction can be detected.

BACKGROUND THE INVENTION

In general, a capacitance type dynamic quantity sensor device has a sensor chip including a movable electrode which can be displaced in a predetermined direction in accordance with application of a dynamic quantity, and a fixed electrode disposed so as to confront the movable electrode, the movable electrode and the fixed electrode being formed on a substrate such as a semiconductor substrate or the like. The capacitance type dynamic quantity sensor device detects the dynamic quantity on the basis of variation of the capacitance between the movable electrode and the fixed electrode in accordance with application of the quantity amount. The dynamic quantity may be acceleration, angular velocity or the like.

Specifically, a capacitance type dynamic quantity sensor device for detecting a dynamic quantity applied to a surface of a substrate in a horizontal direction is known. This type of sensor is designed so that a fixed electrode of a sensor chip is disposed to confront a movable electrode in a horizontal direction to a surface of a substrate, and the movable electrode is displaced in the horizontal direction. The horizontal direction to the surface of the substrate will be hereinafter referred to as "substrate surface horizontal direction".

A sensor device including a sensor chip as described above and a circuit chip having a processing circuit for processing a sensor signal from the sensor chip, etc. has been proposed as one of capacitance type dynamic quantity sensor devices for detecting a dynamic quantity in a substrate surface horizontal direction as described above (for example, see JP-A-11-67820).

In the capacitance type dynamic quantity sensor device as described above, one surface of the substrate of the sensor chip and the circuit chip are disposed so as to be face each other, and the sensor chip and the circuit chip are connected to each other through a bump electrode.

Furthermore, there is also known a capacitance type dynamic quantity sensor device which can detect a dynamic quantity in a direction perpendicular to a surface of a substrate in addition to a dynamic quantity in a substrate surface horizontal direction, that is, a capacitance type dynamic quantity sensor device which can detect a dynamic quantity in a multi-axial direction. In the following description, the direction perpendicular to a surface of a substrate will be hereinafter referred to as "substrate surface vertical direction."

The following problem would occur when a capacitance type dynamic quantity sensor device which can detect a dynamic quantity in a multi-axial direction as described above is constructed.

Here, FIG. 7 is a diagram showing a general construction of the capacitance type dynamic quantity sensor device which can detect the dynamic quantity in the multi-axial direction. Furthermore, FIG. 8A is a plan view showing an example of the specific construction of a horizontal direction detecting unit 900 of FIG. 7, and FIG. 8B is a perspective view showing an example of the specific construction of a vertical direction detecting unit 910 of FIG. 7.

As shown in FIG. 7, the capacitance type dynamic quantity sensor device can be manufactured by using a semiconductor substrate 10 and using well-known semiconductor manufacturing technique and etching technique.

Here, the direction horizontal to the sheet surface of FIG. 7 corresponds to the horizontal direction to a surface of the semiconductor substrate 10 (that is, the substrate surface horizontal direction), and the direction vertical to the sheet surface of FIG. 7 corresponds to the vertical direction to the surface of the semiconductor substrate 10 (that is, the substrate surface vertical direction).

Specifically, FIG. 7 shows a horizontal direction detecting unit 900 having a movable electrode which can be displaced in the substrate surface horizontal direction in accordance with a dynamic quantity such as an acceleration or the like applied in the substrate surface horizontal direction, and a vertical direction detecting unit 910 having a movable electrode which can be displaced in the substrate surface vertical direction in accordance with a dynamic quantity applied in the substrate surface vertical direction.

Wire portions 920 drawn out from the respective detecting units 900 and 910 are formed on the semiconductor substrate 10, and also pads 930 connected to the respective wire portions 920 are formed on the semiconductor substrate 10. These pads 930 will be connected to bonding wires through which the respective detecting units 900 and 910 on the semiconductor substrate 10 are electrically connected to external circuits, etc.

The horizontal direction detecting unit 900 is formed as follows. That is, as shown in FIG. 8A, trench etching is conducted from one surface side of the semiconductor substrate 10 to form grooves, thereby forming a movable electrode 901 and a fixed electrode 902 disposed so as to confront the movable electrode 901 in the substrate surface horizontal direction.

In this case, each of the movable electrode 901 and the fixed electrode 902 is designed to have a comb-shape, and disposed so that the comb-shape teeth thereof are engaged with one another. The movable electrode 901 is joined to the semiconductor substrate 10 through a spring portion (not shown) having a degree of freedom in the substrate surface horizontal direction so as to be displaceable in the substrate surface horizontal direction.

In FIG. 8A, when a dynamic quantity is applied in the substrate surface horizontal direction, the movable electrode 901 is displaced in the same direction, and the distance between the movable electrode 901 and the fixed electrode 902 are varied, so that the capacitance between the movable electrode 901 and the fixed electrode 902 is varied.

This capacitance variation is output as a sensor signal through the wire portions 920, the pads 930 and the bonding wires to an external circuit, thereby detecting the applied dynamic quantity in the substrate surface horizontal direction.

Furthermore, the vertical direction detecting unit 910 is formed as follows. That is, as shown in FIG. 8B, trench etching or sacrifice layer etching and well-known wire forming techniques or the like are conducted from one surface side of the semiconductor substrate 10 to form a movable electrode 911 and fixed electrodes 912 and 913 so that the fixed electrodes 912 and 913 are disposed so as to confront the movable electrode 911 in the substrate surface vertical direction.

Here, the movable electrode 911 is supported by cantilever arms 10a corresponding to the lower side portion of the semiconductor substrate 10, so that the movable electrode 911 is movable in the substrate surface vertical direction.

Furthermore, the fixed electrodes 912 and 913 are formed at the upper and lower sides of the movable electrode 911. The movable electrode 911 and the fixed electrodes 912 and 913 are formed of conductive layers.

In FIG. 8B, when a dynamic quantity is applied in the substrate surface vertical direction, the movable electrode 911 is displaced in the same direction, so that the distance between the movable electrode 911 and the fixed electrode 912 is varied and also the distance between the movable electrode 911 and the fixed electrode 913 is varied. Accordingly, the capacitance between the movable electrode 911 and the fixed electrode 912 and the capacitance between the movable electrode 911 and the fixed electrode 913 are varied. These variations of capacitance are output as a sensor signal corresponding to a differential capacitance variation to the external circuit, thereby detecting the applied dynamic quantity in the substrate surface vertical direction.

As described above, in the conventional capacitance type dynamic quantity sensor device which can detect the dynamic quantity in the multi-axial direction as described above, it is required to equip plural movable and fixed electrodes to detect the two axes (the substrate surface horizontal direction and the substrate surface vertical direction) at the same time. That is, a dedicated detecting unit is equipped for every detection direction of one chip, thereby resulting in an increase of the chip size.

Particularly with respect to the vertical direction detecting unit 910 for detecting the dynamic quantity amount in the substrate surface vertical direction, it is required to fabricate complicated structures by forming the fixed electrodes 912 and 913 as a lower wire and an upper wire as shown in FIG. 8B, resulting in an increase of the manufacturing cost.

Furthermore, in a discrete type dynamic quantity sensor for simultaneously detecting dynamic quantities along two axes (in the substrate surface horizontal direction and the substrate surface vertical direction) on one chip as shown in FIG. 7, many wire portions 920 and pads 930 are needed to carry out wire-bonding between the dynamic quantity sensor and an external circuit.

Accordingly, there is a problem in that the probability of crosstalk between an output from one axis and another axis is increased, that is, the probability that the respective wire portions 920 have electrical influence to one another and noises are superposed on the output is increased.

Furthermore, the arrangement of the wire portions 920 and the pads 930 may become complicated, thereby making wire bonding difficult to perform.

As described above, when a capacitance type dynamic quantity sensor device for detecting a dynamic quantity in a multi-axial direction is implemented, there has hitherto occurred increase of chip size, complication of structures in a wire forming step, a bonding wire forming step, etc.

SUMMARY OF THE INVENTION

Therefore, the present invention has been implemented in view of the foregoing description, and has an object to enable detection of a dynamic quantity in a multi-axial direction by a simple construction suitable for miniaturization in a capacitance type dynamic quantity sensor device for detecting an applied dynamic quantity based on variation of the electrostatic capacitance between a movable electrode and a fixed electrode.

In order to attain the above object, according to a first aspect of the present invention, there is provided a capacitance type acceleration sensor device, comprising a sensor chip having movable electrodes which can be displaced in predetermined directions in accordance with an applied dynamic quantity, and sensor-chip side fixed electrodes disposed to confront the movable electrodes in a horizontal direction to a surface of the substrate, the movable electrodes and the sensor-chip side electrodes being equipped on one surface side of the substrate; and a circuit chip for processing an output signal from the sensor chip, wherein the movable electrodes are joined to the substrate through spring portions having degree of freedom in both a horizontal direction to a surface of the substrate and a vertical direction to the surface of the substrate, the movable electrodes are displaceable in the horizontal direction to the surface of the substrate and the vertical direction to the surface of the substrate which correspond to the predetermined direction, one surface of the substrate of the sensor chip and the circuit chip are disposed so as to confront each other, a circuit-chip side fixed electrode is equipped at the site corresponding to the movable electrodes on a confronting surface of the circuit chip to the substrate, the sensor chip and the circuit chip are electrically connected to each other through bump electrodes, and the dynamic quantity is detected on the basis of a capacitance variation between the movable electrode and the sensor-chip side fixed electrode and a capacitance variation between the movable electrodes and the circuit-chip side fixed electrode in connection with application of the dynamic quantity.

According to the capacitance type dynamic quantity sensor device described above, the spring portions supporting the movable electrodes have degrees of freedom in both the horizontal direction to the surface of the substrate (that is, a substrate surface horizontal direction) and the vertical direction to the surface of the substrate (that is, a substrate surface vertical direction). Therefore, an electrode which can be displaced in both the substrate surface horizontal direction and the substrate surface vertical direction can be implemented by the common electrodes.

The sensor-chip side fixed electrodes disposed so as to confront the movable electrodes in the substrate surface horizontal direction are formed on the sensor chip, and the circuit-chip side fixed electrode is formed on the circuit chip so as to confront the movable electrodes in the substrate surface vertical direction.

Therefore, according to the capacitance type dynamic quantity sensor device of the present invention, the dynamic quantity in the substrate surface horizontal direction and the dynamic quantity in the substrate surface vertical direction can be detected by the common movable electrodes. Accordingly, unlike the conventional sensor device, it is unnecessary to equip a dedicated movable electrode for every detection direction, and thus increase of chip size can be suppressed.

Furthermore, the circuit-chip side fixed electrode may be merely equipped on the surface of the circuit chip, that is, on the confronting surface of the circuit chip to the substrate, so that the circuit-chip side fixed electrode can be easily formed.

In the present invention, the sensor chip may be mounted facedown on the circuit chip and then connected to the circuit chip through bump electrodes. Therefore, it is unnecessary to adopt a complicated connection structure such as wire bonding or the like, and the electrical connection between both the chips can be suitably performed.

Therefore, according to the present invention, the dynamic quantity in the multi-axial direction can be detected by a simple structure suitable for miniaturization in a capacitance type dynamic quantity sensor device for detecting an applied dynamic quantity on the basis of variation of the electrostatic capacitance between the movable electrodes and the fixed electrodes.

According to a second aspect of the present invention, in the capacitance type dynamic quantity sensor device of the first aspect of the present invention, the movable electrodes are disposed in a comb-shaped arrangement, and the sensor-chip side fixed electrodes are also disposed in a comb-shaped arrangement so that the comb-shaped movable electrodes are engaged with the comb-shaped sensor-chip side fixed electrodes. The circuit-chip side fixed electrode has the comb-shape corresponding to that of the movable electrode.

The movable electrodes, the sensor-chip side fixed electrodes and the circuit-chip side fixed electrode can be designed as described above.

In the foregoing description, the reference numerals in parentheses of the respective elements are examples used to show the corresponding relation with specific elements in the following embodiments.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

A preferred embodiment according to the present invention will be described hereunder with reference to the accompanying drawings. In the following embodiment, the present invention is applied to a capacitance type semiconductor acceleration sensor device (capacitance type acceleration sensor device) as a capacitance type dynamic quantity sensor device.

The capacitance type acceleration sensor device of this embodiment can be applied to a vehicle acceleration sensor for controlling the operation of an air bag, ABS, VSC or the like, a gyro sensor or the like.

Figure 1:
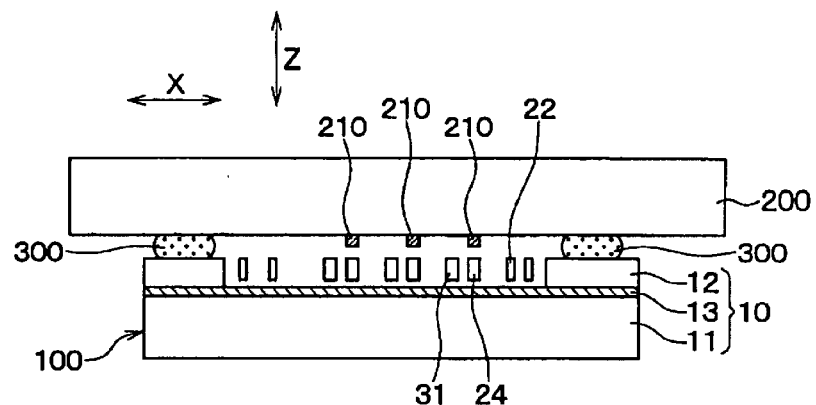
FIG. 1 is a schematic sectional view showing the overall construction of a capacitance type dynamic quantity sensor device according to an embodiment of the present invention.

FIG. 1 is a cross-sectional view showing the overall construction of a capacitance type dynamic quantity sensor device according to an embodiment of the present invention. One surface of a substrate 10 of a sensor chip 100 and a circuit chip 200 are disposed so as to confront each other, and the sensor chip 100 and the circuit chip 200 are electrically/mechanically connected to each other through bump electrodes 300.

First, the construction of each of the sensor chip 100 and the circuit chip 200 will be described.

<Sensor Chip>

Figure 2:
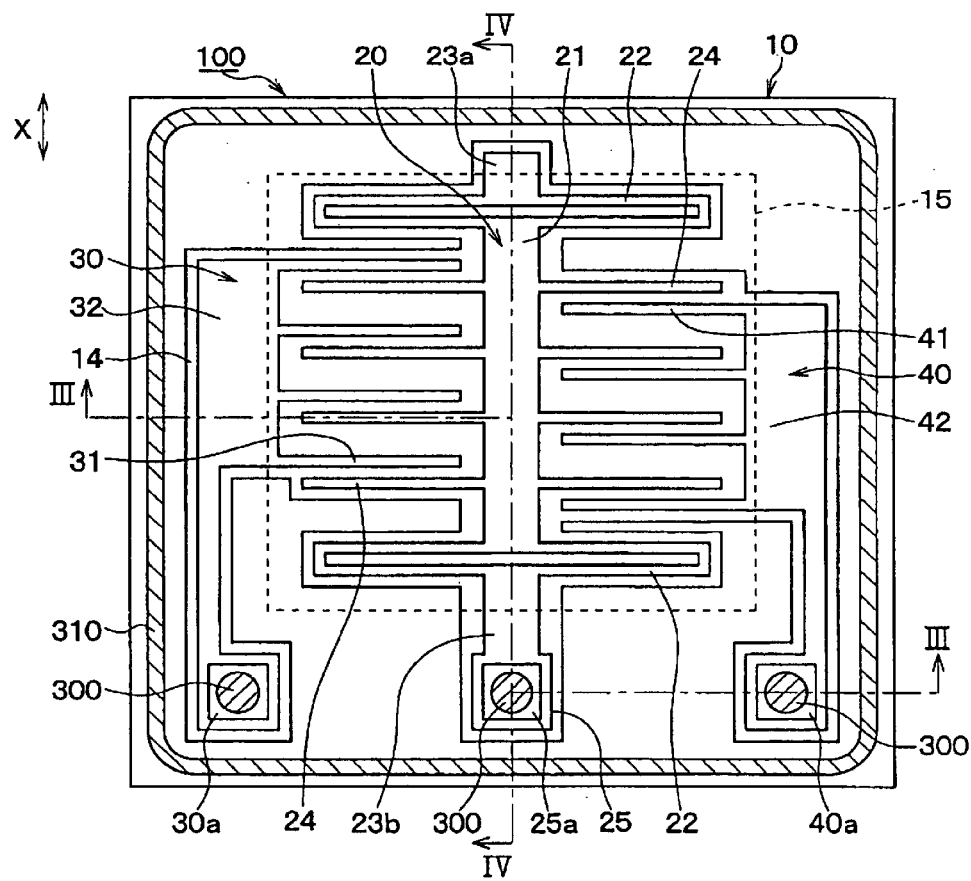
FIG. 2 is a schematic plan view showing a sensor chip of the capacitance type acceleration sensor device shown in FIG. 1.
Figure 3:
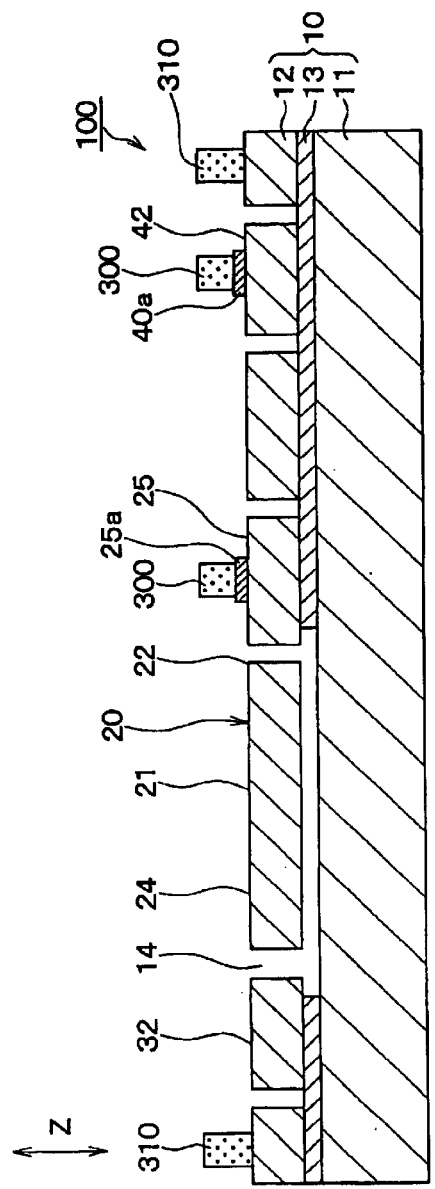
FIG. 3 is a cross-sectional view of the sensor chip which is taken along line III—III of FIG. 2.
Figure 4:
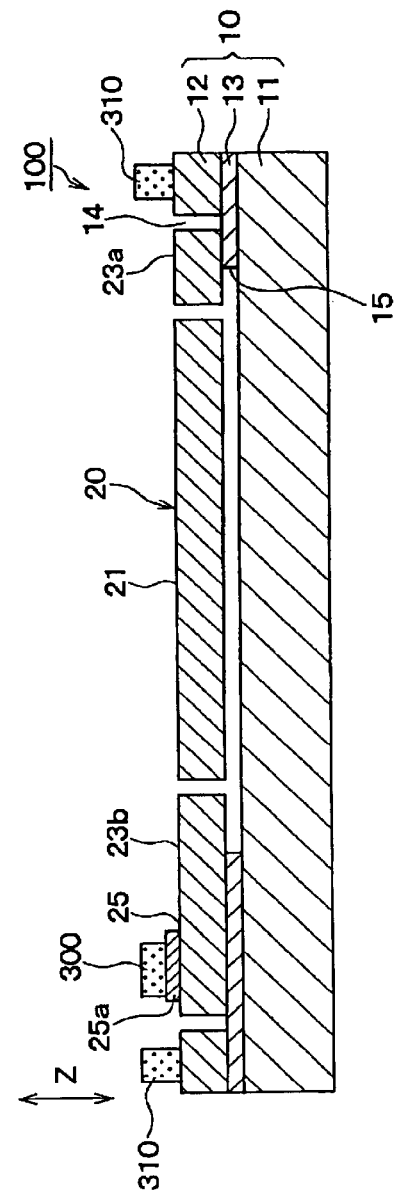
FIG. 4 is a cross-sectional view of the sensor chip which is taken along line IV—IV of FIG. 2.

FIG. 2 is a plan view showing the sensor chip 100 of the capacitance type acceleration sensor device of this embodiment, FIG. 3 is a cross-sectional view of the sensor chip 100 which is taken along line III—III of FIG. 2, and FIG. 4 is a cross-sectional view of the sensor chip 100 which is taken along line IV—IV of FIG. 2.

The sensor chip 100 is formed by conducting well-known micromachining on the semiconductor substrate 10 as the substrate.

In this embodiment, the semiconductor substrate 10 constituting the sensor chip 100 comprises a rectangular SOI substrate 10 having a first silicon substrate 11 as a first semiconductor layer, a second silicon substrate 12 as a second semiconductor layer and oxide film 13 as an insulating layer disposed between the first and second silicon substrates 11 and 12.

Comb-shaped beam structures comprising a movable portion 20 and fixed portions 30 and 40 are formed on the second silicon substrate 12 by forming a groove on the second silicon substrate 12. The oxide film 13 is removed in a rectangular form at a site thereof which corresponds to formation areas of the beam structures 20 to 40, thereby forming an opening portion 15 indicated by a dotted line in FIG. 2.

The sensor chip 100 thus constructed is manufactured as follows, for example. A mask having the shape corresponding to the beam structures is formed on the second silicon substrate 12 of the SOI substrate 10 by using the photolithography technique.

Thereafter, trench etching is carried out by using dry etching under gas atmosphere of $CF_4$, $SF_6$ or the like to form the groove 14, whereby the beam structures 20 to 40 are formed in a lump. Subsequently, the oxide film 13 is removed by sacrifice layer etching using hydrofluoric acid or the like to form the opening portion 15. The sensor chip 100 can be manufactured according to the above process.

In the sensor chip 100, the movable portion 20 disposed so as to cross over the opening portion 15 is designed so that both the ends of a slender and rectangular poise portion 21 are integrally joined to anchor portions 23a and 23b through spring portions 22.

As shown in FIG. 4, the anchor portions 23a and 23b are fixed to one pair of confronting side portions of the opening edge portion of the rectangular opening portion 15 and mounted on the first silicon substrate 11 serving as a support substrate. Accordingly, the poise portion 21 and the spring portions 22 are kept to face the opening portion 15.

Furthermore, the spring portions 22 have degrees of freedom in a direction horizontal to the surface of the semiconductor substrate 10 (hereinafter referred to as "substrate surface horizontal direction") and a direction vertical to the surface of the semiconductor substrate 10 (hereinafter referred to as "substrate surface vertical direction").

In this case, as shown in FIG. 2, each of the spring portions 22 is designed in such a rectangular frame shape that two parallel beams are joined to each other at both the ends thereof, and it has a spring function so that it is displaceable in a direction perpendicular to the longitudinal direction of the two beams.

Specifically, when an acceleration containing a component in an X-direction indicated by an arrow (hereinafter referred to as "X-direction") of FIG. 2 is applied to the spring portions 22, the spring portions 22 displace the poise portion 21 in the X-direction. In addition, the spring portions 22 also restore the poise portion 21 to an original state in accordance with vanishment of the acceleration.

On the other hand, when an acceleration containing a component in a Z-direction indicated by an arrow (hereinafter referred to as "Z-direction") of FIGS. 3 and 4 is applied to the spring portions 22, the spring portions 22 displace the poise portion 21 in the Z-direction. In addition, the spring portions 22 also restore the poise portion 21 to an original state in accordance with vanishment of the acceleration.

Accordingly, the movable portion 20 joined to the semiconductor substrate 10 through the spring portions 22 is displaceable in the X-direction, that is, in the substrate surface horizontal direction above the opening portion 15, and also it is displaceable in the Z-direction, that is, in the substrate surface vertical direction.

Furthermore, as shown in FIG. 2, the movable portion 20 is equipped with plural movable electrodes 24 which are formed like a beam and arranged in a comb shape along the longitudinal direction (X-direction) of the poise portion 21 so as to extend from both the side surfaces of the poise portion 21 in the opposite directions (along the direction perpendicular to the longitudinal direction (X-direction) of the poise portion 21.

In other words, the arrangement direction of the movable electrodes 24 corresponds to the longitudinal direction (X-direction) of the poise portion 21, and plural movable electrodes 24 are arranged in a comb-shape along the arrangement direction. In FIG. 2, every four movable electrodes 24 are formed at each of the right and left sides of the poise portion 21 so as to project outwardly. Each movable electrode 24 is formed like a beam having a rectangular shape in section, and kept to face the opening portion 15.

As described above, each movable electrode 24 is integrally formed with the spring portions 22 and the poise portion 21, so that each movable electrode 24 can be displaced in the substrate surface horizontal direction (X-direction) and the substrate surface vertical direction (Z-direction) together with the spring portions 22 and the poise portion 21.

Furthermore, as shown in FIGS. 2 to 4, the fixed portions 30 and 40 are mounted on the other pair of confronting side portions of the opening edge portion of the rectangular opening portion 15 in the oxide film 13, on which the anchor portions 23*a* and 23*b* are not mounted.

In FIG. 2, the fixed portion 30 located at the left side of the poise portion 21 comprises left-side fixed electrodes 31 and a wire portion 32 for the left-side fixed electrodes 31 (hereinafter referred to as a left-side fixed electrode wire portion"). Furthermore, the fixed portion 40 located at the right side of the poise portion 21 comprises right-side fixed electrodes 41 and a wire portion 42 for the right-side fixed electrodes 41 (hereinafter referred to as right-side fixed electrode wire portion").

Each of the fixed electrodes 31 and 41 are constructed as sensor-chip side fixed electrodes 31, 41 formed on the sensor chip 100. In this embodiment, the fixed electrodes 31 (41) are arranged in a comb-shape so as to be inserted in the gaps between the respective neighboring movable electrodes 24 as shown in FIG. 2.

Here, in FIG. 2, at the left side of the poise portion 21, each of the left-side fixed electrodes 31 is disposed at the upper side of each movable electrode 24 along the X-direction. On the other hand, at the right side of the poise portion 21, each of the right-side fixed electrodes 41 is disposed at the lower side of each movable electrode 24 along the X-direction.

As described above, the respective fixed electrodes 31 and 41 are disposed so as to face the individual movable electrodes 24 in the substrate surface horizontal direction, and a detection interval for detecting capacitance is formed between the side surface of each movable electrode 24 and the side surface of each of the fixed electrodes 31 and 41 in each confronting interval.

Furthermore, the left-side fixed electrodes 31 and the right-side fixed electrodes 41 are electrically independent of each other. Each of the fixed electrodes 31 and 41 is formed in a beam shape having a rectangular section so as to extend substantially in parallel to the movable electrodes 24.

Here, the left-side fixed electrodes 31 and the right-side fixed electrodes 41 are kept to be supported in a cantilever style by the fixed electrode wire portions 32 and 42, respectively. That is, the left-side fixed electrode 31 and the right-side fixed electrode 41 are designed so that plural electrodes are collected to the electrically common wire portions 32 and 42.

A left-side fixed electrode pad 30*a* and a right-side fixed electrode pad 40*a* are formed at predetermined positions on the left-side fixed electrode wire portion 32 and the right-side fixed electrode wire portion 42, respectively.

A movable electrode wire portion 25 is formed with being integrally joined to one anchor portion 23*b*, and a movable electrode pad 25*a* is formed at a predetermined position on the wire portion 25. Each of the pads 25*a*, 30*a*, 40*a* is formed of aluminum by sputtering, vapor deposition or the like.

<Circuit Chip>

Figure 5:
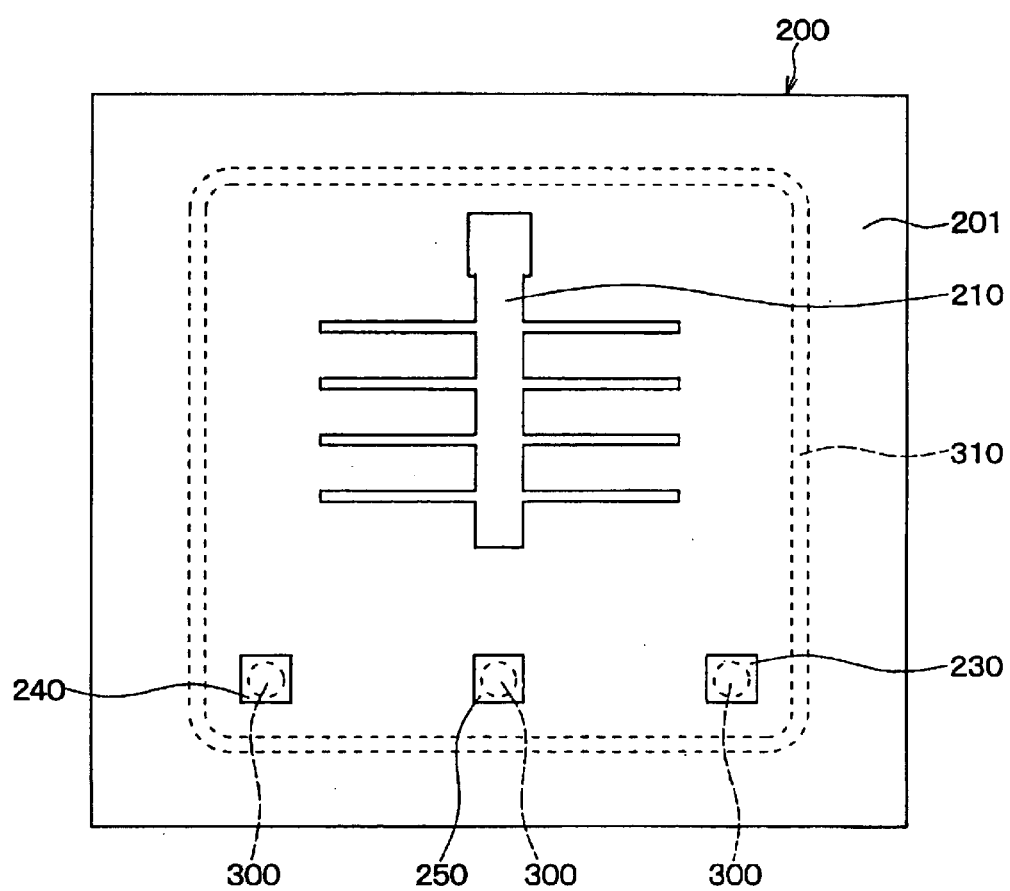
FIG. 5 is a schematic plan view showing a circuit chip of the capacitance type acceleration sensor device shown in FIG. 1.

FIG. 5 is a plan view showing the circuit chip 200 of the capacitance type acceleration sensor device of this embodiment. The circuit chip 200 is formed as a detection circuit described later (see FIG. 6) for processing an output signal from the sensor chip 100.

Specifically, the circuit chip 200 may be manufactured by forming elements such as transistors, etc. (not shown) and wire portions on a semiconductor substrate such as a silicon substrate or the like with a well-known semiconductor manufacturing technique.

FIG. 5 shows a confronting surface 201 of the circuit chip 200 to the semiconductor substrate 10. As shown in FIG. 5, the circuit-chip side fixed electrode 210 is equipped at the site corresponding to the movable electrodes 24 on the confronting surface 201 of the circuit chip 200.

That is, the circuit-chip side fixed electrode 210 is equipped at the portion of the confront surface of the circuit chip 200 to which the movable electrodes 24 of the sensor chip 100 are confronted under the state that the circuit chip 200 and the sensor chip 100 are disposed so as to face each other as shown in FIG. 1.

In this case, the circuit-chip side fixed electrode 210 is designed to have a comb-shape which is conformed with the comb-shaped arrangement of the movable electrodes 24. The circuit-chip side fixed electrode 210 can be formed on a surface (confronting surface 201) of the circuit chip 200 by freely using a normal wire forming technique adopted for the semiconductor manufacturing process.

Although the present invention is not limited, the circuit-chip side fixed electrode 210 may be formed of polysilicon or the like by Chemical Vapor Deposition (CVD) or the like, or formed of aluminum or the like by sputtering, vapor deposition or the like.

Furthermore, circuit-chip side fixed electrode pads 230 and 240 are formed at the site corresponding to the left-side fixed electrode pad 30a of the sensor chip 100 and the site corresponding to the right-side fixed electrode pad 40a of the sensor chip 100 on the confronting surface 201 of the circuit chip 200, respectively.

Furthermore, a circuit-chip side movable electrode pad 250 is formed at the site corresponding to the movable electrode pad 25a of the sensor chip 100 on the confronting surface 201 of the circuit chip 200.

Each of the pads 230, 240 and 250 of the circuit chip 200 may be formed of polysilicon, aluminum or the like as in the case of the circuit-chip side fixed electrode 210.

The circuit-chip side fixed electrode 210 and the respective pads 230, 240, 250 of the circuit chip 200 constitute a detection circuit together with elements and wire portions (not shown) formed on the circuit chip 200.

<Fabrication of Sensor Chip and Circuit Chip>

The sensor chip 100 and the circuit chip 200 thus constructed are connected to each other through the bump electrodes 300 while one surface of the semiconductor substrate 10 of the sensor chip 100 and the confronting surface 201 of the circuit chip 200 are confronted to each other, thereby forming the capacitance type acceleration sensor device of this embodiment.

Here, as shown in FIGS. 2 to 5, the left-side fixed electrode pad 30a of the sensor chip 100 and the circuit-chip side fixed electrode pad 230, the right-side fixed electrode pad 40a of the sensor chip 100 and the circuit-chip side fixed electrode pad 240, the movable electrode pad 25a of the sensor chip 100 and the circuit-chip side movable electrode pad 250 are respectively electrically/mechanically connected to each other through the bump electrodes 300.

The bump electrodes 300 are illustrated as being disposed at the sensor chip 100 side in FIGS. 2 to 4. In FIG. 2, the planar shape thereof is illustrated as hatched areas. In the circuit chip 200 shown in FIG. 5, the planar shape of the bump electrodes 300 is indicated by broken lines.

Materials which can be applied as normal bumps may be used as the bump electrodes 300. Specifically, solder-paste print, solder bumps which can be arranged by plating, vapor deposition or the like may be used.

Furthermore, as shown in FIGS. 1 to 5, the sensor chip 100 and the circuit chip 200 are mechanically connected to each other through solder 310 at the peripheral edge portions of the confronting portions of the chips 100 and 200.

In FIGS. 2 to 4, the solder 310 is illustrated as being disposed at the sensor chip 100 side. Here, the planar shape of the solder 310 is illustrated as a hatched area, and it is also indicated by a broken line in FIG. 5.

As shown in FIGS. 1 to 5, the solder 310 is arranged in an annular form at the peripheral edge portion of the confronting site of the sensor chip 100 and the circuit chip 200, whereby the connection between the chips 100 and 200 is made sure.

The fabrication of the sensor chip 100 and the circuit chip 200 as described above may be carried out as follows.

First, solder which will serve as the bump electrodes 300 and the solder 310 are supplied to any one of the sensor chip 100 and the circuit chip 200. Thereafter, the sensor chip 100 is mounted on the circuit chip 200 and solder reflow is carried out. The capacitance type acceleration sensor device of this embodiment can be manufactured as described above.

<Detecting Operation>

Next, the detecting operation of the capacitance type acceleration sensor device of this embodiment will be described. In this embodiment, an acceleration is detected on the basis of a capacitance variation between the movable electrodes 24 and the sensor-chip side fixed electrodes 31, 41 and a capacitance variation between the movable electrodes 24 and the circuit-chip side fixed electrode 210 which are caused by application of the acceleration.

First, the detecting operation of the acceleration based on the capacitance variation between the movable electrodes 24 and the sensor-chip side fixed electrodes 31, 41, that is, the operation of detecting the acceleration applied in the substrate surface horizontal direction will be described.

As described above, the sensor chip 100 is equipped with the fixed electrodes 31, 41 so that the fixed electrodes 31, 41 individually face each movable electrode 24, and a detection interval for detecting the capacitance is set in the confronting interval between each fixed electrode and each movable electrode.

Here, first capacitance CS1 is formed at the interval between the left-side fixed electrodes 31 and the movable electrodes 24, and second capacitance CS2 is formed at the interval between the right-side fixed electrode 41 and the movable electrode 24.

When an acceleration is applied in the substrate surface horizontal direction, that is, in the X-direction of FIG. 2, the overall movable portion 20 excluding the anchor portions is integrally displaced in the X-direction by the spring function of the spring portions 22, and each capacitance CS1, CS2 varies in accordance with the displacement of the movable electrodes 24 in the X-direction.

For example, it is assumed that the movable portion 20 is displaced downwardly (toward the lower side of the drawing of FIG. 2) along the X-direction. At this time, the interval between each left-side fixed electrode 31 and each movable electrode 24 increases, and the interval between each right-side fixed electrode 41 and each movable electrode 24 decreases.

Accordingly, the acceleration in the substrate surface horizontal direction can be detected on the basis of the differential capacitance (CS1−CS2) based on the movable electrodes 24 and the sensor-chip side fixed electrodes 31 and 41. Specifically, a signal based on the differential capacitance (CS1−CS2) is output as an output signal from the sensor chip 100. This signal is processed in the circuit chip 200 and finally output.

Figure 6:
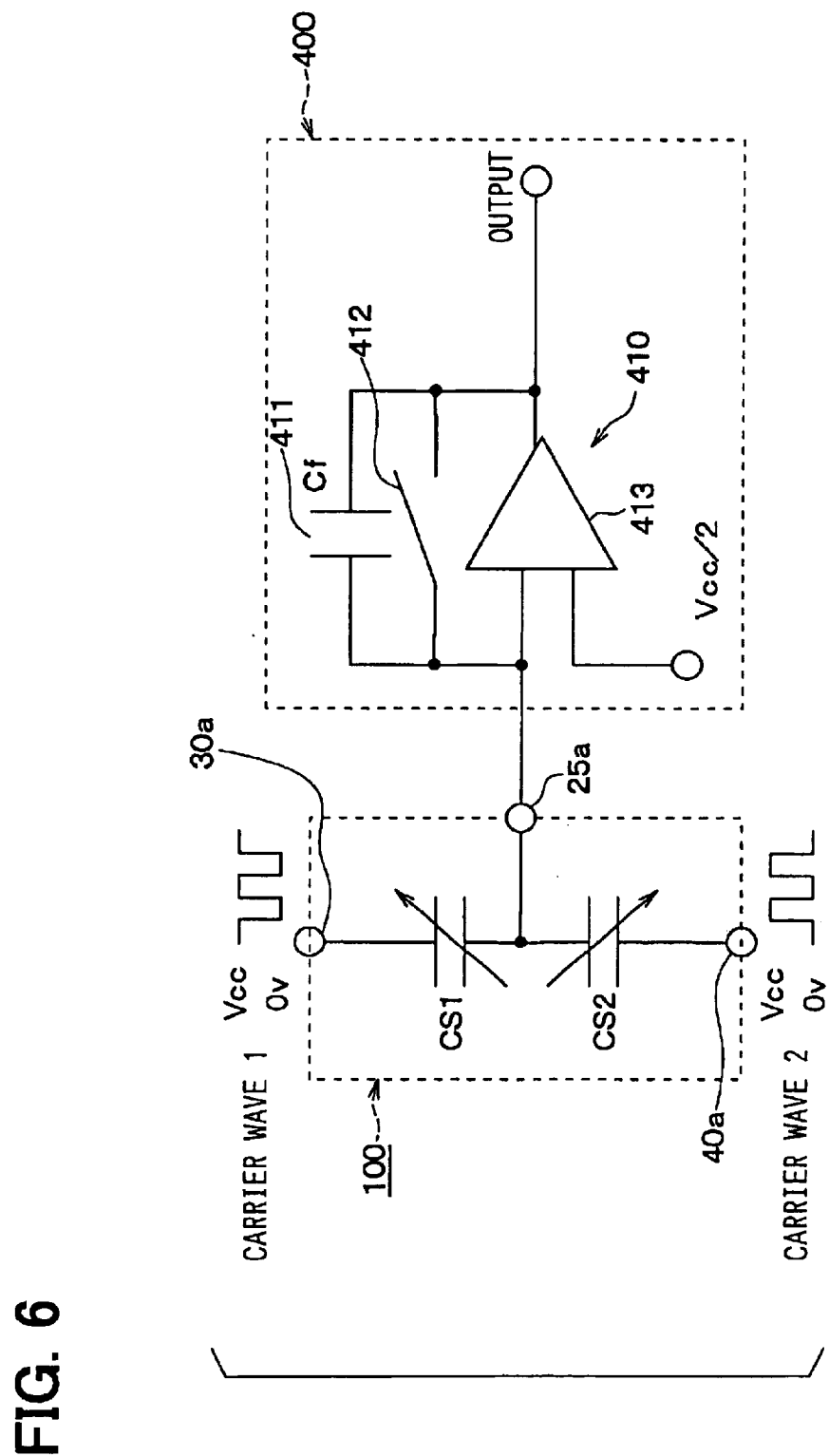
FIG. 6 is a circuit diagram showing an example of a detection circuit for detecting an acceleration in a substrate surface horizontal direction of the capacitance type acceleration sensor device shown in FIG. 1.
Figure 7:
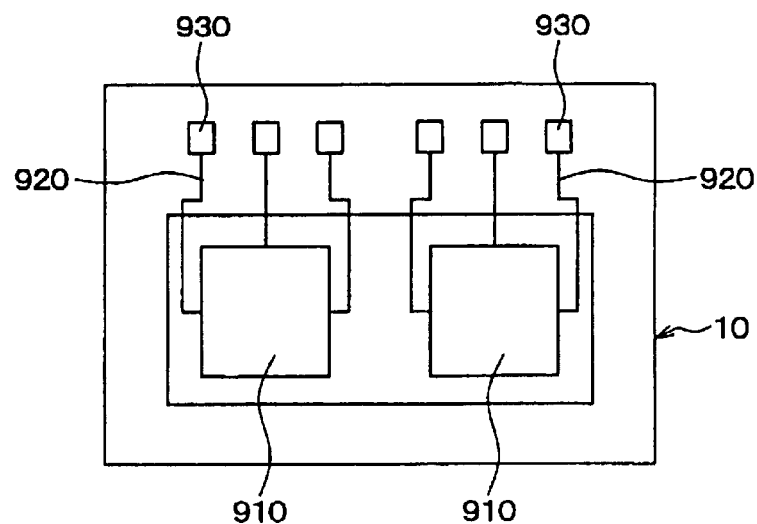
FIG. 7 is a schematic diagram showing a general construction of a related art capacitance type dynamic quantity sensor device for detecting a dynamic quantity in a multi-axial direction.
Figure 8A:
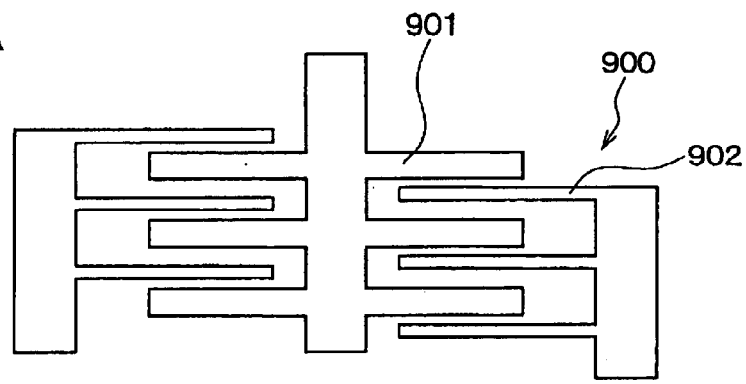
FIG. 8A is a plan view showing a specific construction of a horizontal direction detecting unit of FIG. 7.
Figure 8B:
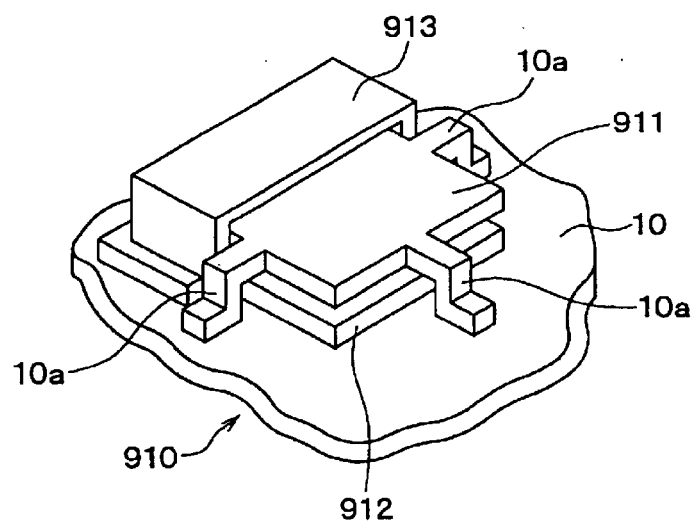
FIG. 8B is a perspective view showing a specific construction of a vertical direction detecting unit of FIG. 7.

FIG. 6 is a circuit diagram showing an example of a detection circuit 400 for detecting the acceleration in the substrate surface horizontal direction in the capacitance type acceleration sensor device. In the detecting circuit 400, a switched capacitance circuit (SC circuit) 410 is equipped with a capacitor 411 having capacitance of CF, a switch 412 and a differential amplifying circuit 413, and converts a capacitance difference (CS1−CS2) input thereto to a voltage.

The capacitance type acceleration sensor device of this embodiment is supplied with carrier wave 1 of Vcc in amplitude from the left-side fixed electrode 30a, and also carrier wave 2 displaced in phase from the carrier wave 1 by 180° from the right-side fixed electrode pad 40*a* to open/close the switch 412 of the SC circuit 410 at a predetermined timing.

At this time, the carrier wave 1 and the carrier wave 2 are transmitted from the circuit chip 200 through the circuit-chip side fixed electrode pads 230 and 240 and the bump electrodes 300 to the left-side fixed electrode pad 30*a* and the right-side fixed electrode pad 40*a*, respectively.

The applied acceleration in the substrate surface horizontal direction is output as a voltage value of V0 as shown in the following equation 1.

$$V0=(CS1-CS2)\cdot Vcc/Cf \qquad \text{(Equation 1)}$$

Next, the acceleration detecting operation based on the capacitance variation between the movable electrodes 24 and the circuit-chip side fixed electrode 210, that is, the operation of detecting the acceleration applied in the substrate surface vertical direction will be described.

As shown in FIG. 1, in the laminate structure of the sensor chip 100 and the circuit chip 200, the circuit-chip side fixed electrode 210 is disposed to face each movable electrode 24 of the sensor chip 100 in the substrate surface vertical direction, and a detection interval for detecting capacitance is set in the confronting interval between each movable electrode 24 and the circuit-chip side fixed electrode 210.

When an acceleration is applied in the substrate surface vertical direction, that is, in the Z-direction of FIGS. 3 and 4, the overall movable portion 20 excluding the anchor portions is integrally displaced in the Z-direction, and the capacitance between the movable electrodes 24 and the circuit-chip side fixed electrode 210 is varied in accordance with the displacement of the movable electrodes 24 in the Z-direction.

For example, in FIGS. 3 and 4, it is assumed that the movable portion 20 is displaced downwardly (toward the lower side of the drawings). At this time, the interval between the circuit-chip side fixed electrode 210 and the movable electrodes 24 decreases.

Accordingly, the acceleration in the substrate surface vertical direction can be detected on the basis of the capacitance variation based on the movable electrodes 24 and the circuit-chip side fixed electrode 210. Specifically, a signal based on this capacitance variation is output as an output signal from the sensor chip 100 as in the case of the detection of the acceleration in the substrate surface horizontal direction. This signal is processed in the circuit chip 200, and finally output.

As not shown, a detection circuit for detecting the acceleration in the substrate surface vertical direction in the capacitance type acceleration sensor device of this embodiment may be achieved by modifying the detection circuit 400 shown in FIG. 6 so that the capacitance portion is replaced by variable capacitance between the movable electrodes 24 and the circuit-chip side fixed electrode 210.

<Features, etc.>

As described above, according to this embodiment, there can be provided a capacitance type acceleration sensor device having the following features.

(1) One surface side of a substrate 10 is equipped with a sensor chip 100 having movable electrodes 24 which can be displaced in predetermined directions X,Z in accordance with an applied acceleration, and sensor-chip side fixed electrodes 31, 41 disposed so as to confront the movable electrodes 24 in a horizontal direction X to a surface of the substrate 10, the movable electrodes 24 and the sensor-chip side electrodes 31, 41 being equipped on one surface side of the substrate 10, and a circuit chip 200 for processing an output signal from the sensor chip 100.

(2) The movable electrodes 24 are joined to the substrate 10 through spring portions 22 having degrees of freedom in both a horizontal direction X to a surface of the substrate 10 and a vertical direction Z to the surface of the substrate 10. The movable electrodes 24 are displaceable in the horizontal direction X to the surface of the substrate 10 and the vertical direction Z to the surface of the substrate 10 which correspond to the predetermined direction.

(3) One surface of the substrate 10 of the sensor chip 100 and the circuit chip 200 are disposed to confront each other.

(4) A circuit-chip side fixed electrode 210 is equipped at the site corresponding to the movable electrodes 24 on a confronting surface 201 of the circuit chip 200 to the substrate 10.

(5) The sensor chip 100 and the circuit chip 200 are electrically connected to each other through bump electrodes 300.

(6) The acceleration is detected on the basis of a capacitance variation between the movable electrode and the sensor-chip side fixed electrode 31, 41 and a capacitance variation between the movable electrodes 24 and the circuit-chip side fixed electrode 210 in connection with application of the acceleration.

According to the capacitance type acceleration sensor device described above, the spring portions 22 supporting the movable electrodes 24 have degrees of freedom in both the substrate surface horizontal direction and the substrate surface vertical direction. Therefore, the electrodes which can be displaced in both the substrate surface horizontal direction and the substrate surface vertical direction can be implemented by the common electrodes 24.

The sensor-chip side fixed electrodes 31, 41 disposed so as to confront the movable electrodes 24 in the substrate surface horizontal direction X are formed on the sensor chip 100, and the circuit-chip side fixed electrode 210 is formed on the circuit chip 200 so as to confront the movable electrodes 24 in the substrate surface vertical direction Z.

Therefore, according to the capacitance type acceleration sensor device of the present invention, the acceleration in the substrate surface horizontal direction X and the acceleration in the substrate surface vertical direction Z can be detected by the common movable electrodes 24. Accordingly, unlike the conventional sensor device, it is unnecessary to equip a dedicated movable electrode every detection direction, and thus increase of chip size can be suppressed.

Furthermore, the circuit-chip side fixed electrode 210 may be merely equipped on the surface of the circuit chip 200, that is, on the confronting surface (201) of the circuit chip 200 to the substrate 10, so that the circuit-chip side fixed electrode 210 can be easily formed. In this embodiment, the sensor chip 100 may be mounted facedown on the circuit chip 200 and then connected to the circuit chip 200 through bump electrodes. Therefore, it is unnecessary to adopt a complicated connection structure such as wire bonding or the like, and the electrical connection between both the chips 100, 200 can be suitably performed.

Therefore, according to this embodiment, the acceleration in the multi-axial direction can be detected by a simple structure suitable for miniaturization in a capacitance type acceleration sensor device for detecting an applied acceleration on the basis of variation of the electrostatic capacitance between the movable electrodes 24 and the fixed electrodes 31, 41, 210.

Furthermore, when plural movable electrodes 24 are disposed in a comb-shaped arrangement as in the case of the capacitance type acceleration sensor device shown in FIG. 1, the sensor-chip side fixed electrodes 31, 41 are also disposed in a comb-shaped arrangement so that the comb-shaped movable electrodes 24 are engaged with the comb-shaped sensor-chip side fixed electrodes 31, 41, and the circuit-chip side fixed electrode 210 is designed to have the comb-shape corresponding to that of the movable electrode 24, whereby the action and effect described above can be suitably implemented.

The movable electrodes 24, the sensor-chip side fixed electrodes 31, 41 and the circuit-chip side fixed electrode 210 may be designed in the comb-shape described above, however, the shapes of these electrodes are not limited to the comb shape.

(Other Embodiments)

In the above embodiment, the substrate surface horizontal direction along which the movable electrodes are displaced is one direction. However, the above embodiment may be modified so that the spring portions are designed so as to have degree of freedom in two directions of the substrate surface horizontal direction and the movable electrodes are joined to and supported by the spring portions thus constructed. For example, each spring portion may be constructed by a first spring portion having degree of freedom in one direction of the substrate surface horizontal direction and the substrate surface vertical direction and a second spring portion having degree of freedom in the other direction of the substrate surface horizontal direction and the substrate surface vertical direction.

By using the spring portions thus constructed, there can be implemented a capacitance type dynamic quantity sensor device which can detect a dynamic quantity in three-axis direction, the two directions along the substrate surface horizontal direction and one direction along the substrate surface vertical direction.

The sensor chip 100 shown in FIGS. 2 to 4 is applied to a normal comb-shaped capacitance type acceleration sensor. The present invention has been implemented by paying attention to an idea that the spring portions 22 also have degree of freedom in the substrate surface vertical direction in the sensor chip 100 as described above.

That is, in the above embodiment, a capacitance type dynamic quantity sensor device having detection sensitivity in a multi-axial direction can be implemented by using a normal acceleration sensor without making any great design modification.

Furthermore, in addition to the capacitance type acceleration sensor device described above, the present invention may be applied to a dynamic quantity sensor such as a capacitance type angular velocity sensor for detecting an angular velocity as a dynamic quantity, etc.

What is claimed is:

1. A capacitance type dynamic quantity sensor device comprising:

a sensor chip having movable electrodes which can be displaced in predetermined directions in accordance with an applied dynamic quantity, and sensor-chip side fixed electrodes disposed so as to confront the movable electrodes in a horizontal direction to a surface of a substrate of the sensor chip, wherein the movable electrodes and the sensor-chip side electrodes are disposed on one surface side of the substrate; and a circuit chip for processing an output signal from the sensor chip, wherein the movable electrodes are joined to the substrate through spring portions having degrees of freedom in both a horizontal direction to a surface of the substrate and a vertical direction to the surface of the substrate, wherein the movable electrodes are displaceable in the horizontal direction to the surface of the substrate and the vertical direction to the surface of the substrate which correspond to the predetermined direction, wherein one surface of the substrate of the sensor chip and the circuit chip are disposed to confront each other, wherein a circuit-chip side fixed electrode is equipped at a site corresponding to the movable electrodes on a confronting surface of the circuit chip to the substrate, wherein the sensor chip and the circuit chip are electrically connected to each other through bump electrodes, and wherein the dynamic quantity is detected on the basis of a capacitance variation between the movable electrodes and the sensor-chip side fixed electrode and a capacitance variation between the movable electrodes and the circuit-chip side fixed electrode caused by application of the dynamic quantity.

2. The capacitance type dynamic quantity sensor device according to claim 1, wherein the movable electrodes are disposed in a comb-shaped arrangement, and the sensor-chip side fixed electrodes are also disposed in a comb-shaped arrangement so that the comb-shaped movable electrodes are inserted in gaps between the respective comb-shaped sensor-chip side fixed electrodes, and the circuit-chip side fixed electrode has a comb-shape corresponding to the comb-shaped arrangement of the movable electrodes.

3. The capacitance type dynamic quantity sensor device according to claim 1, further comprising a support layer for supporting the sensor chip and the circuit chip in a parallel configuration, wherein the support layer is at least as thick as the bump electrodes.

4. The capacitance type dynamic quantity sensor device according to claim 3, wherein the support layer is formed from same material as the bump electrodes.

5. The capacitance type dynamic quantity sensor device according to claim 3, wherein the support layer is disposed at least at an opposite side to the bump electrodes in the sensor chip.

6. The capacitance type dynamic quantity sensor device according to claim 5, wherein the support layer surrounds a peripheral edge portion in the sensor chip.

* * * * *